Oct. 30, 1923.
S. E. BROOMALL
1,472,511
TRACTION APPLIANCE FOR VEHICLE WHEELS
Filed Dec. 1, 1921
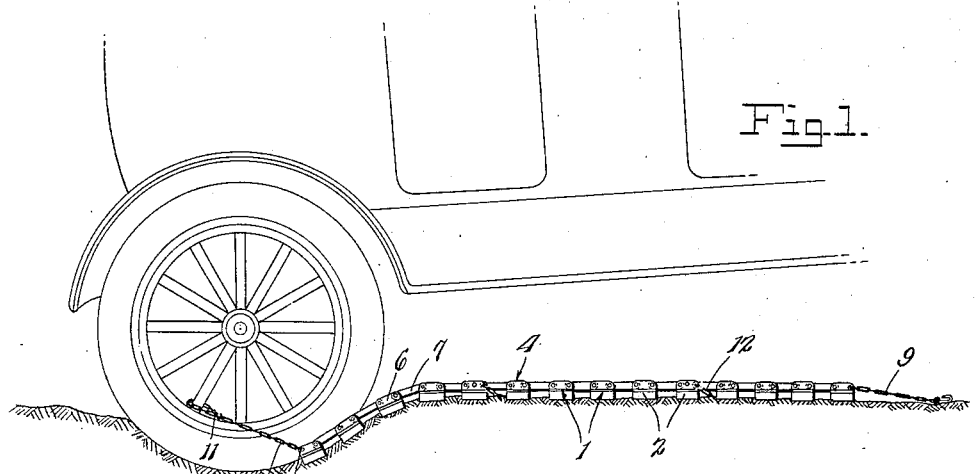
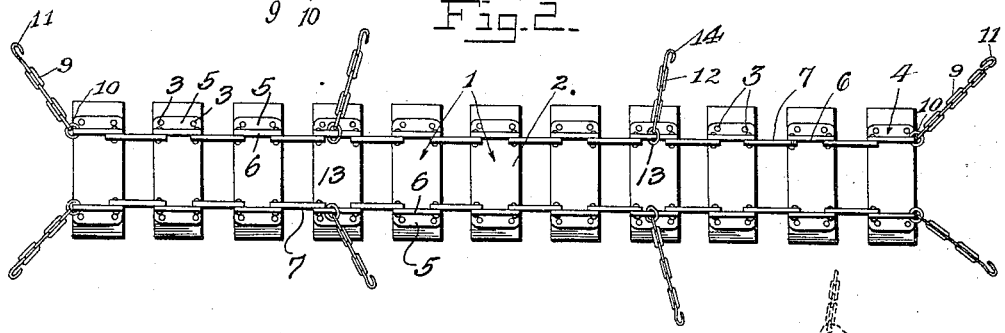
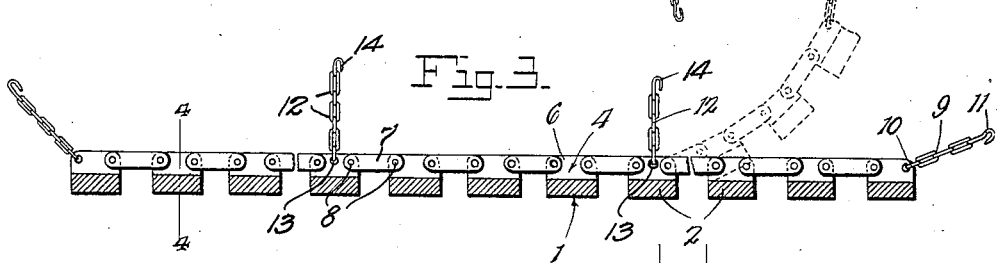
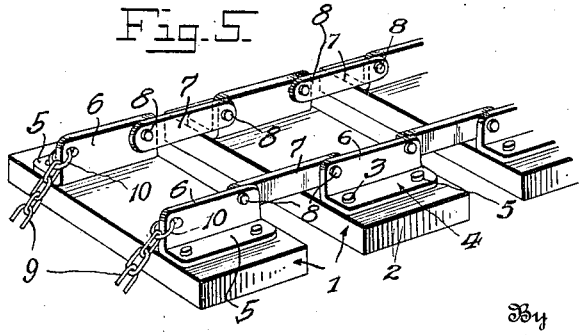
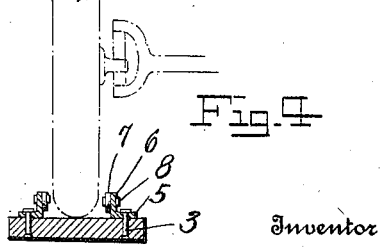
Inventor
S. E. Broomall.
By Lacey & Lacey, Attorneys Patented Oct. 30, 1923.

1,472,511

UNITED STATES PATENT OFFICE.

SAMUEL E. BROOMALL, OF WILMINGTON, DELAWARE.

TRACTION APPLIANCE FOR VEHICLE WHEELS.

Application filed December 1, 1921. Serial No. 519,180.

*To all whom it may concern:*

Be it known that I, SAMUEL E. BROOMALL, a citizen of the United States, residing at Wilmington, in the county of New Castle and State of Delaware, have invented certain new and useful Improvements in Traction Appliances for Vehicle Wheels, of which the following is a specification.

This invention relates to improvements in traction appliances for vehicle wheels and has as one of its objects to provide a traction appliance which will be especially useful in extricating an automobile from a rut, gully, or other sunken road surface, or from mud, sand, or soft soil, or from a bank of snow, although the appliance is adapted also for use as a temporary or auxiliary tread applicable circumferentially to the rear wheels of such a vehicle.

Various forms of appliances have been devised for the purpose above mentioned and usually, when they are of this particular type, comprise a series of tread lugs or shoes flexibly connected by links and adapted to be laid in the path of travel of the rear wheels of the vehicle to be extricated and to be connected to the said wheels so that when the engine is started and the clutch is engaged, the wheels will be caused to travel onto the appliance, and the tractive engagement of the lugs or shoes with the road surface will prevent spinning of the wheels. However it has been found that the majority of such appliances present certain disadvantages which impair their efficiency. For example the shoes are ordinarily connected together in a series by cables, ropes, or chain links, which connections are flexible to such an extent that lateral distortion of the appliance is liable to occur. Thus while the rear wheels to which the appliances are connected at one end may travel for a short distance along the series of shoes comprising the respective appliances, the other shoes of the appliances may become laterally displaced because of the character of the road surface, or for other reasons, so that the vehicle wheels will run off the appliances. To be most effective, it is therefore essential that the shoes be maintained in alignment throughout the entire series and prevented from such lateral displacement as that referred to, and it is therefore one of the primary objects of the present invention to provide, in an appliance of this class, a connection between the shoes of the series of such nature as to maintain them in alignment so that when the appliance is properly disposed in advance of one of the traction wheels of a stalled automobile and properly connected thereto and the machine is started forwardly, the wheel will run onto the appliance throughout the entire length thereof and thus the desired tractive force will be maintained for a sufficient period of time to enable the vehicle wheel to pass entirely out of the depression or other impeding agency. As in the use of the appliance it is connected at one end to the wheel to be extricated, and as the machine is propelled forwardly it will be wound circumferentially about the tread of the wheel, the connection between the shoes of the appliance, embodying the invention, is especially desirable as it will maintain the shoes in true alignment and insure of the appliance being wound circumferentially about the wheel tread to completely surround the same and without likelihood of lateral displacement or distortion of a portion of the length of the appliance as would be extremely likely to occur if the shoes were connected by more or less flexible elements.

Another object of the invention is to provide a connection between the shoes of the appliance of such a nature that it will constitute a guiding means for coaction with the side of the wheel tire to further insure against lateral distortion of the appliance.

Another object of the invention is to provide means whereby the appliance may be disposed circumferentially of the wheel and connected therewith in such a manner as to serve for any desired period of time as an antiskid device or auxiliary tread.

In the accompanying drawings:

Figure 1 is a side elevation of one of the appliances, the view illustrating the manner in which the same is to be employed in extricating an automobile wheel from a rut;

Figure 2 is a plan view of the appliance removed;

Figure 3 is a vertical longitudinal sectional view through the appliance.

Figure 4 is a vertical transverse sectional view on the line 4—4 of Figure 3; and Figure 5 is a perspective view of one end portion of the appliance.

The appliance embodying the invention comprises a series of tread shoes indicated by the numeral 1 and each comprising a preferably rectangular block 2 which may be of wood or any other material found suitable for the purpose. Secured by bolts or rivets 3 to the upper face of each shoe 2 near the ends thereof are fixed brackets indicated in general by the numeral 4. Each of these brackets comprises right-angularly disposed wings 5 and 6, the wings 5 being secured as stated to the upper face of the shoe 2, and the wing 6 projecting vertically from the plane of said face and transversely of the length of the shoe. The brackets 4 are of a length corresponding substantially to the width of the shoes and therefore they serve as a means for reinforcing the blocks comprising the shoes and preventing spreading or warping of said blocks. The shoes are connected in a series with their relatively adjacent longitudinal edges suitably spaced as illustrated in Figures 2 and 3 of the drawings, by means of links 7 preferably of bar metal the ends of which links are connected by pivots 8 to the relatively adjacent ends of the wings 6 of the brackets 4 throughout the series of shoes. It will be observed by reference to the drawings that the ends of the links are disposed flat against the sides or faces of the wings 6 and inasmuch as these links are rigid and so disposed and they are pivoted to the wings by the pins 8 which are engaged through their ends and through the said wings at right angles to the planes occupied by the wings and links, there can be no relative lateral displacement of any one shoe with relation to the next adjacent shoe, and the connection between the shoes throughout the series is braced in such a manner as to insure against lateral distortion. However the connection is such that the appliance may be freely flexed in a manner to permit it to adapt itself to the tread of the wheel to which it is connected but flexure in any other direction is inhibited. By reference to Figure 4 of the drawings it will be observed that the wings 6 of the bracket members 4, and the link 7 which connect the shoes, project above the planes of the upper sides of the shoes a sufficient distance to form guides between which the tire of the wheel is adapted to travel, in the use of the appliance, thus serving as an additional means for preventing lateral distortion of the appliance.

In order to provide for connection of the appliance with the vehicle wheel, chains 9 are connected as at 10 to the wings 6 of the bracket members 4 upon the terminal shoes of the series and are provided at their free ends with hooks 11 engageable with their links after the chains have been engaged about the spokes of the wheel in the manner illustrated in Figure 1. Other chains 12 are connected as at 13 to the bracket members of intermediate ones of the shoes and are provided with hooks 14 at their free ends, and these latter chains serve as a means whereby the intermediate portion of the appliance may be connected with the wheel when the appliance is to be used as an auxiliary tread and is to remain assembled with the wheel while the machine is being driven over muddy, soft, or sandy roads.

In the use of the appliance one end thereof is disposed as close as is possible to the wheel to be extricated and the chains 9 at this end of the appliance are engaged about a conveniently located one of the spokes of the wheel. The engine is then started and the clutch engaged so as to impart rotary motion to the wheel and as the wheel rotates the appliance will be drawn toward it over the ground surface until it engages the surface with sufficient tractive force to prevent its further movement whereupon the continued rotation of the wheel will result in the same climbing onto the appliance and thus leaving the depression in the road surface in which it was seated. Ordinarily the wheels will be extricated by the time they have traveled less than the entire length of the appliances connected to them but if the depression is of such extent that the wheels will not be extricated by the time they have traveled the full length of the appliances, the desired results will still be obtained for in the rotation of the wheels the respective appliances have been wound circumferentially about their treads and the machine may continue to be propelled in a forward direction without further regard to the appliances and until its driving wheels have entirely left the depression. If desired the appliance may be employed as an auxiliary or traction tread in which event the chains 12 as well as all of the chains 9 will be engaged about the spokes of the wheel so that the series of shoes 1 will extend circumferentially of the wheel tread.

It will be understood that the appliance embodying the invention may be employed where a vehicle is to be backed out of a rut as well as where it is to be driven forwardly.

Having thus described the invention what is claimed as new is:

1. A traction appliance comprising a series of tread shoes, brackets secured to the upper faces of the shoes and each provided with an upstanding rigid wing extending the full width of the shoe, and rigid links pivoted to the wings of the brackets of adjacent shoes to flexibly connect the same, the said links being disposed flat against the wings of the brackets whereby to inhibit lateral flexing of the series of shoes and the links and the brackets forming a continuous guide for a wheel riding the shoes.

2. A traction appliance comprising a series of tread shoes, brackets secured to the upper faces of the shoes and each consisting of a base wing resting on the shoe and extending the full width thereof and a second wing upstanding from and coterminous with the base wing, rigid flat links disposed flat against the sides of the upstanding wings and pivoted thereto whereby to connect the shoes in a series flexible in the direction of its length and inflexible laterally.

3. A traction appliance comprising a series of tread shoes, brackets secured to the upper faces of the shoes and each comprising an angle plate having a base wing resting upon the upper face of one of the shoes to extend the full width thereof and a second upstanding wing coterminous with the base wing, fastening devices extending through the base wings of the brackets near the side edges of the shoes rigidly connecting the brackets with the shoes whereby said brackets will brace the shoes transversely, and links pivotally connected to the upstanding wings of the brackets connecting the shoes in a series.

In testimony whereof I affix my signature.

SAMUEL E. BROOMALL. [L. S.]